C. V. JOHNSON.
WIND SHIELD ATTACHMENT.
APPLICATION FILED JUNE 25, 1917.
1,270,165.
Patented June 18, 1918.
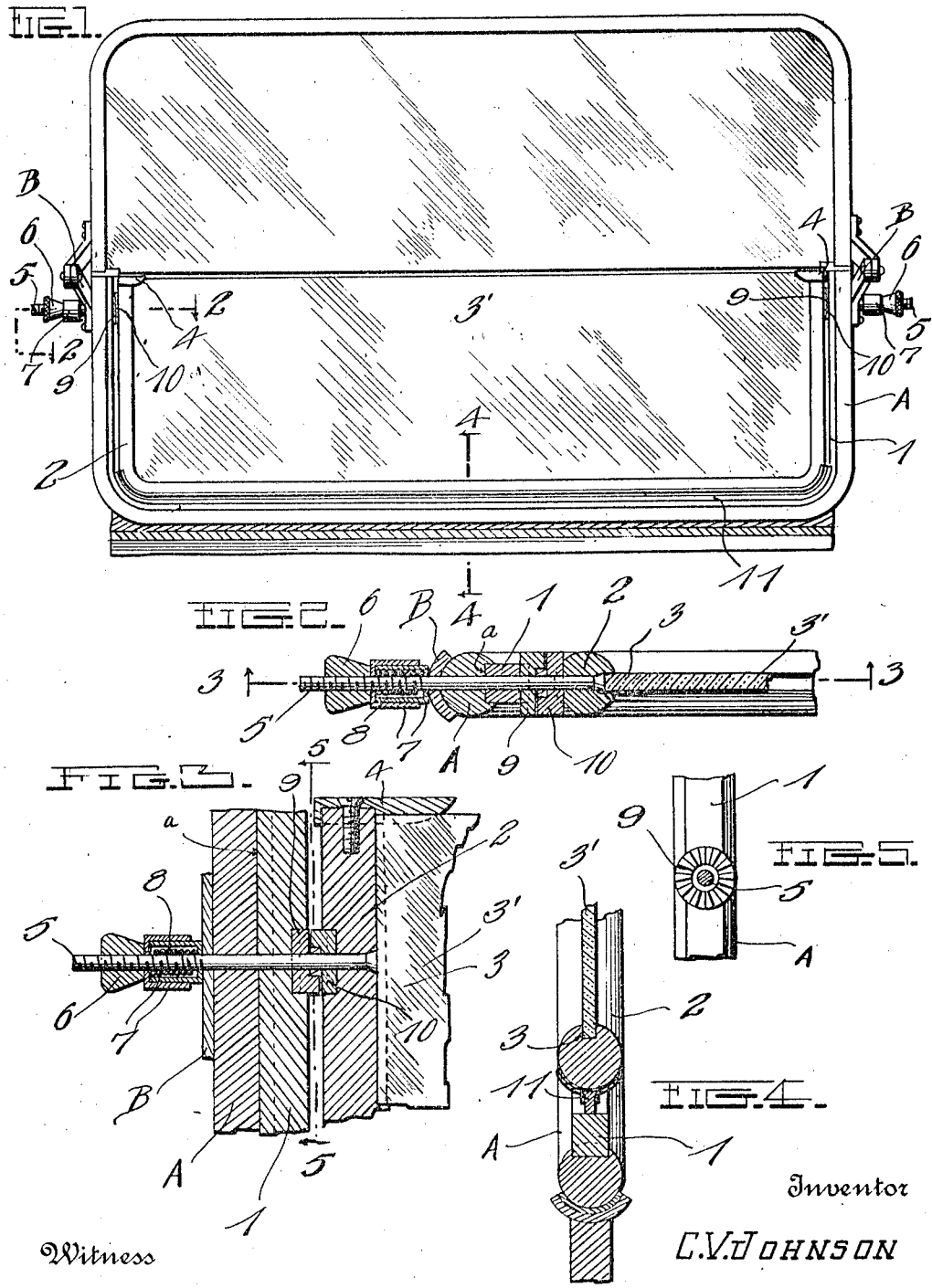
Witness
George W. Goosmith
Inventor
C. V. JOHNSON
By H. R. Wilson &co
Attorneys

UNITED STATES PATENT OFFICE.

CLARENCE VERNE JOHNSON, OF YATES CENTER, KANSAS.

WIND-SHIELD ATTACHMENT.

1,270,165.  Specification of Letters Patent.  Patented June 18, 1918.

Application filed June 25, 1917. Serial No. 176,827.

*To all whom it may concern:*

Be it known that I, CLARENCE V. JOHNSON, a citizen of the United States, residing at Yates Center, in the county of Woodson and State of Kansas, have invented certain new and useful Improvements in Wind-Shield Attachments; and I do declare the following to be a full, clear, and exact description of the invention, such as will enable others skilled in the art to which it appertains to make and use the same.

This invention relates generally to windshields for vehicles, more particularly to certain new and useful improvements in an attachment for vehicle windshields.

Some types of windshields for vehicles, comprise a relatively fixed or stationary lower pane and an upper pane which is pivotally connected to the lower pane so that it may be adjusted angularly or swung downwardly out of the way. Oftentimes the lower pane of the windshield prevents proper ventilation or circulation of air through the car, and it is to overcome this disadvantage that the present invention is devised. To this end, the invention consists of a frame which is adapted to fit between the posts of the ordinary windshield and in the grooves arranged in the inner sides of the same, and a pane-carrying frame pivotally connected to the other frame so that it may be adjusted angularly to allow the air to be deflected downwardly into the lower portion or body of the car.

Another object of the invention is to provide a means whereby the pane carrying frame may be effectively maintained in its various angularly adjusted positions.

A still further object of the invention is to generally improve upon devices of this class by the provision of a comparatively simple, strong, durable and inexpensive construction, one which will be efficient and reliable in operation, and well adapted to the purpose for which it is designed.

In the accompanying drawing forming a part of the application, and in which similar reference characters designate like parts throughout the several views:

Figure 1 is a front elevation of a windshield, illustrating the application thereto of a device constructed in accordance with this invention;

Fig. 2 is a detail horizontal sectional view taken on the line 2—2 of Fig. 1;

Fig. 3 is a vertical sectional view taken on the line 3—3 of Fig. 2;

Fig. 4 is a transverse sectional view taken on the line 4—4 of Fig. 1; and

Fig. 5 is a sectional view taken on the line 5—5 of Fig. 3.

Referring more particularly to the drawings, the letters A represent the usual upright posts which support the lower pane of an ordinary windshield, said pane usually having its edges disposed in grooves *a* arranged on the inner sides of the posts. The letter B represents the brackets which are usually bolted to the upper ends of the posts A and to which the lower edge of an adjustable windshield pane is pivotally connected.

The present invention consists of an adjustable pane which may be substituted for the relatively fixed or stationary lower pane of the windshield, and it comprises a U-shaped frame 1 which is disposed between the posts A, the side members of the frame 1 being received in the glass receiving grooves *a* in said posts and the lower member in a similar groove arranged in the transverse bar which is usually disposed between the lower ends of the posts. Obviously the glass forming the lower relatively stationary windshield pane must be removed in order to allow the U-shaped frame 1 to be slid downwardly into its proper position between the posts.

Mounted within the frame 1 is a second U-shaped frame 2 having grooves 3 in its inner sides to receive a suitable pane of glass 3', the latter being prevented from shifting upwardly by means of the usual caps 4 secured to the upper ends of the sides of the frame 2. Extending outwardly from the sides of the frame 2 adjacent the upper end of the same, and projecting through openings arranged in the frame 1 and posts A, are pivot bolts 5, to the free ends of which are threaded nut members 6. Between the inner sides of the nut members 6 and the outer sides of the posts A are telescopic casings 7 in which are housed coiled springs 8, the latter surrounding the bolts 5 for holding the various parts of the device in comparatively tight engagement with one another so as to prevent rattling.

The numerals 9 and 10 represent a pair of circular disks having central openings therein through which the bolts 5 extend, and having their opposing or adjacent sides corrugated or formed with teeth having cam faces. These disks 9 and 10 are fixed to the adjacent sides of the frames 1 and 2, being disposed in suitable recesses therein. By this construction, it may be seen that the pane-carrying frame 2 is pivotally connected at its upper edge to the U-shaped frame 1 and consequently to the upper end of the posts A, and it may be adjusted to various angular positions and maintained in these positions by means of the disks 9 and 10, the cam-teeth thereof which engage each other with sufficient friction and locking tendency as to prevent their relative movement even under the vibration of the car, and yet allow them to have movement with relation to one another when sufficient manual force is applied to cause the cam-teeth to spring the vertical sides of the frame A outward. It may be seen that the hinge members or connectors B that connect the upper and lower sections of the shield, being of relatively thin and flat material, will yield for allowing the spreading of the frame A without detrimentally affecting the upper frame or section of the shield.

The openings in the sides of the frame 2 through which the bolts 5 extend are countersunk from the inner sides of said frame so that these bolts may be inserted after this frame is disposed within the frame 1 and before the pane 3' is slid in place. It is preferable to extend the bolts 5 through the openings in the posts A which usually receive one of the screws by which the above referred to brackets are attached to said posts. These screws are to be entirely omitted as the bolts 5 will perform their functions.

Fixed in any suitable manner to the lower end of the frame 2 is a suitable weather strip 11 which, when the frame 2 is in its upright position, will fit snugly against the horizontal bar disposed between the two posts A and prevent rain, snow, and air from passing beneath.

The device may be readily and easily attached to windshields now on the market without any special adaptation of the windshields for it. The advantages arising from the use of a device constructed and applied as above described, will be apparent, and hence a more elaborate explanation is not necessary.

As various changes in form, proportion, and in the minor details of construction may be resorted to without departing from the spirit of this invention, it is to be understood that I do not wish to be limited to the precise construction herein shown and described.

I claim:

1. The combination with a windshield having a pair of upright posts provided with grooves in their inner sides; of a U-shaped frame removably fitted between said posts and received in said grooves, a pane-carrying frame disposed within said U-shaped frame and pivoted at its upper end thereto so as to deflect the air downwardly and means coöperative with said posts for maintaining said pane-carrying frame in its angularly adjusted positions.

2. The combination with a windshield having a pair of upright posts provided with grooves in their inner sides, of a U-shaped frame removably fitted between said posts and received in said grooves, a pane-carrying frame disposed within said U-shaped frame, and pivot bolts projecting outwardly from the sides of said pane-carrying frame adjacent the upper edge thereof and extending through said U-shaped frame and said posts.

3. The combination with a windshield having a pair of upright posts provided with grooves in their inner sides; of a U-shaped frame removably fitted between said posts and received in said grooves, a pane-carrying frame disposed within said U-shaped frame, pivot bolts projecting outwardly from the sides of said pane-carrying frame adjacent the upper edge thereof and extending through said U-shaped frame and said posts, and coöperating friction members carried by said frames for maintaining the pane-carrying frame in its angularly adjusted positions.

4. The combination with a windshield having a pair of upright posts provided with grooves in their inner sides; of a U-shaped frame removably fitted between said posts and received in said grooves, a pane-carrying frame disposed within said U-shaped frame, pivot bolts projecting outwardly from the sides of said pane-carrying frame adjacent the upper edge thereof, said bolts extending through said U-shaped frame and said posts and provided at their outer ends with nuts, coiled springs surrounding said bolts and disposed between said nuts and the outer sides of said posts, and corrugated disks arranged in opposing relation and carried by said frames for maintaining the pane carrying frame in its angularly adjusted positions.

In testimony whereof I have hereunto set my hand in the presence of two subscribing witnesses.

CLARENCE VERNE JOHNSON.

Witnesses:
C. A. STEWART,
BYRON SHARITS.